United States Patent
Sun et al.

(10) Patent No.: US 10,867,157 B2
(45) Date of Patent: Dec. 15, 2020

(54) DISPLAY DEVICE, METHOD FOR OPERATING DISPLAY DEVICE AND ELECTRONIC DEVICE

(71) Applicant: BOE TECHNOLOGY GROUP CO., LTD., Beijing (CN)

(72) Inventors: Yanliu Sun, Beijing (CN); Shiming Shi, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/391,543

(22) Filed: Apr. 23, 2019

(65) Prior Publication Data
US 2020/0074138 A1 Mar. 5, 2020

(30) Foreign Application Priority Data
Aug. 31, 2018 (CN) .......................... 2018 1 1014493

(51) Int. Cl.
| | |
|---|---|
| G06K 9/00 | (2006.01) |
| G01L 1/14 | (2006.01) |
| G01L 1/26 | (2006.01) |
| G06F 21/32 | (2013.01) |
| G06K 9/20 | (2006.01) |
| G06T 7/40 | (2017.01) |
| H01L 27/32 | (2006.01) |
| H01L 51/52 | (2006.01) |
| G09G 3/3208 | (2016.01) |

(52) U.S. Cl.
CPC .............. *G06K 9/0004* (2013.01); *G01L 1/14* (2013.01); *G01L 1/26* (2013.01); *G06F 21/32* (2013.01); *G06K 9/2027* (2013.01); *G06T 7/40* (2013.01); *H01L 27/3225* (2013.01); *H01L 27/3234* (2013.01); *H01L 51/5271* (2013.01); *H01L 51/5284* (2013.01); *G09G 3/3208* (2013.01)

(58) Field of Classification Search
CPC .... G06K 9/00; G06K 9/0004; H01L 27/3234; G06F 3/0414
See application file for complete search history.

(56) References Cited

U.S. PATENT DOCUMENTS

| | | | | |
|---|---|---|---|---|
| 2017/0300736 | A1* | 10/2017 | Song | G06K 9/00033 |
| 2019/0172875 | A1* | 6/2019 | Kang | H01L 27/3234 |
| 2019/0294287 | A1* | 9/2019 | Kim | G06F 3/0412 |
| 2019/0310724 | A1* | 10/2019 | Yeke Yazdandoost | G06F 3/0412 |

* cited by examiner

*Primary Examiner* — Joseph R Haley
(74) *Attorney, Agent, or Firm* — Collard & Roe, P.C.

(57) ABSTRACT

A display device and a method for operating a display device is provided. The display device includes a display panel, a photosensitive image sensor, and a pressure sensing sensor. The display panel includes a display area and has a display side and a back side opposite to the display side. The photosensitive image sensor and the pressure sensing sensor are stacked in the display area of the display panel and are located on the back side of the display panel. The pressure sensing sensor is configured to sense a pressing action on the display side of the display panel. The photosensitive image sensor is configured to detect an image of a texture on the display side of the display panel.

11 Claims, 5 Drawing Sheets

DISPLAY DEVICE, METHOD FOR OPERATING DISPLAY DEVICE AND ELECTRONIC DEVICE

The present disclosure claims priority of Chinese Patent Application No. 201811014493.9, filed on Aug. 31, 2018, the disclosure of which is hereby entirely incorporated by reference as a part of the present disclosure.

TECHNICAL FIELD

Embodiments of the present disclosure relate to a display device, a method for operating a display device and an electronic device.

BACKGROUND

With the increasing popularity of mobile terminals, more and more users use mobile terminals for identity authentication, electronic payment and other operations. Due to the uniqueness of a fingerprint pattern, the fingerprint recognition technology in combination with optical imaging is gradually adopted by mobile electronic devices for identity authentication, electronic payment, and the like. How to design a display device with a more optimized structure is a focus of attention in the industry.

SUMMARY

At least one embodiment of the present disclosure provides a display device comprising a display panel, a photosensitive image sensor, and a pressure sensing sensor. The display panel comprises a display area and has a display side and a back side opposite to the display side. The photosensitive image sensor and the pressure sensing sensor are stacked in the display area of the display panel and are located on the back side of the display panel. The pressure sensing sensor is configured to sense a pressing action on the display side of the display panel. The photosensitive image sensor is configured to detect an image of a texture on the display side of the display panel.

As an example, in a display device provided by an embodiment of the present disclosure, the pressure sensing sensor is stacked between the photosensitive image sensor and the back side of the display panel, and the pressure sensing sensor is further configured to allow light incident from the display side of the display panel to pass through the pressure sensing sensor and reach the photosensitive image sensor.

As an example, in a display device provided by an embodiment of the present disclosure, the photosensitive image sensor is stacked between the pressure sensing sensor and the back side of the display panel.

As an example, a display device provided by an embodiment of the present disclosure further comprises a light shielding layer. The light shielding layer comprises a plurality of apertures arranged in an array. The apertures overlap with the photosensitive image sensor in a direction perpendicular to the display panel. The apertures are configured to allow light from the display side of the display panel to pass through the apertures to reach the photosensitive image sensor for pinhole imaging.

As an example, in a display device provided by an embodiment of the present disclosure, the pressure sensing sensor comprises a first electrode, a second electrode, and a pressure sensing layer. The first electrode, the second electrode, and the pressure sensing layer are disposed in a stack. The pressure sensing layer is disposed between the first electrode and the second electrode. The first electrode is closer to the display panel than the second electrode.

As an example, in a display device provided by an embodiment of the present disclosure, the pressure sensing layer comprises one selected from a group consisting of an optical transparent adhesive layer and a void layer.

As an example, in a display device provided by an embodiment of the present disclosure, a refractive index of the first electrode, a refractive index of the pressure sensing layer, and a maximum imaging angle of the pinhole imaging comply with:

$$\frac{n_1}{n_2} = \frac{1}{\sin\theta_1}$$

in which n1 is the refractive index of the first electrode, n2 is the refractive index of the pressure sensing layer, and θ1 is the maximum imaging angle of light incident from the display side of the display panel through the apertures to be imaged on the photosensitive image sensor.

As an example, in a display device provided by an embodiment of the present disclosure, the display panel comprises a pixel array. The pixel array comprises a plurality of pixel units. An aperture is formed between adjacent pixel units. The aperture overlaps with the photosensitive image sensor in a direction perpendicular to the display panel and the aperture is configured to allow light from the display side of the display panel to pass through the aperture to reach the photosensitive image sensor for pinhole imaging.

As an example, in a display device provided by an embodiment of the present disclosure, the pixel unit comprises a light emitting device. Light emitted by the light emitting device during operation is reflected by the texture on the display side of the display panel for a texture image recognition.

As an example, a display device provided by an embodiment of the present disclosure further comprises a controller. The controller is configured to receive a feedback signal sent by the pressure sensing sensor after the pressure sensing sensor has sensed the pressing action on the display side of the display panel, control the display panel to emit light, and control the photosensitive image sensor to perform a texture image recognition.

At least one embodiment of the present disclosure further provides a method for operating a display device according to any embodiment of the present disclosure, comprising causing the pressure sensing sensor to detect whether the display panel is pressed, causing the display panel to emit light, and controlling the photosensitive image sensor to perform a texture image recognition.

As an example, a method for operating a display device provided by an embodiment of the present disclosure further comprises unlocking a system lock state of an electronic device comprising the display device in a case where the texture image recognition successes; or controlling the display panel not to emit light in a case where the texture image recognition fails.

At least one embodiment of the present disclosure further provides a method for operating a display device, the display device comprises a display panel, a photosensitive image sensor, and a pressure sensing sensor. The display panel comprises a display area and having a display side and a back side opposite to the display side. The photosensitive image sensor is disposed corresponding to the display area and is configured to detect a texture on the display side of the display panel. The pressure sensing sensor is disposed corresponding to the display area and is configured to sense a pressing action on the display side of the display panel. The method comprises causing the pressure sensing sensor to sense the pressing action on the display side of the display panel, causing the display panel to emit light, and controlling the photosensitive image sensor to perform a texture image recognition.

At least one embodiment of the present disclosure further provides an electronic device comprising a light emitting panel, a photosensitive image sensor, and a pressure sensing sensor. The light emitting panel comprises a light emitting area, and has a first side and a second side opposite to the first side. The photosensitive image sensor and the pressure sensing sensor are stacked in the light emitting area of the light emitting panel and located on the second side of the light emitting panel. The pressure sensing sensor is configured to sense a pressing action on the first side of the light emitting panel. The photosensitive image sensor is configured to detect an image of a texture on the first side of the light emitting panel.

As an example, in an electronic device provided by an embodiment of the present disclosure, the pressure sensing sensor is stack between the photosensitive image sensor and the second side of the light emitting panel. The pressure sensing sensor is further configured to allow light incident from the first side of the light emitting panel to pass through the pressure sensing sensor to reach the photosensitive image sensor.

As an example, in an electronic device provided by an embodiment of the present disclosure, the photosensitive image sensor is stacked between the pressure sensing sensor and the second side of the light emitting panel.

As an example, an electronic device provided by an embodiment of the present disclosure further comprises a light shielding layer. The light shielding layer comprises a plurality of apertures arranged in an array. The apertures overlap with photosensitive image sensor in a direction perpendicular to the light emitting panel, and the apertures are configured to allow light from the first side of the light emitting panel to pass through the apertures to reach the photosensitive image sensor for pinhole imaging.

As an example, in an electronic device provided by an embodiment of the present disclosure, the pressure sensing sensor comprises a first electrode, a second electrode, and a pressure sensing layer. The first electrode, the second electrode, and the pressure sensing layer are disposed in a stack. The pressure sensing layer is disposed between the first electrode and the second electrode, and the first electrode is closer to the light emitting panel than the second electrode.

BRIEF DESCRIPTION OF THE DRAWINGS

In order to clearly illustrate the technical solutions of the embodiments of the disclosure, the drawings of the embodiments will be briefly described in the following; it is obvious that the drawings described below are only related to some embodiments of the disclosure and thus are not limitative of the disclosure.

DETAILED DESCRIPTION

Figure 1A:
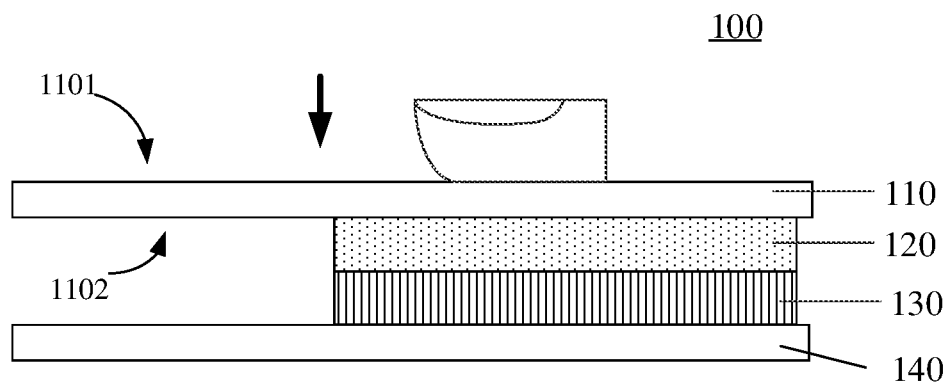
FIG. 1A is a schematic cross-sectional view of a display device according to an embodiment of the present disclosure.

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Unless otherwise defined, technical terms or scientific terms used in the present disclosure are intended to be understood in the ordinary meaning of the ordinary skill of the art. The words "first", "second", and similar terms used in the present disclosure do not indicate any order, quantity, or importance, but are used to distinguish different components. Similarly, the words "a", "an", "the" or the like does not indicate a quantity limit, but indicate "at least one". The words "comprise", "include" or the like means that the elements or items preceding the words contain the elements or items after the words and their equivalents, but do not exclude other elements or items. The words "connect", "interconnect" or the like are not limited to physical or mechanical connections, but may include electrical connections, either directly or indirectly. The words "upper", "lower", "left", "right" and the like are only used to indicate the relative positional relationships, and when the absolute position of the object described is changed, the relative positional relationship may also change accordingly.

Currently, narrow-frame display technology has gradually become the mainstream. One of the ways to realize this technology is to integrate a photosensitive image sensor with a fingerprint recognition function into the display screen to realize an under-screen fingerprint recognition and increase the area of a display area of the display screen. A technique for realizing the under screen fingerprint recognition is to use pinhole imaging combined with the photosensitive image sensor for a fingerprint image acquisition. In this technique, a light shielding layer for opening the imaging aperture is usually provided to perform the pinhole imaging.

As to a smart phone with the under-screen fingerprint recognition function, when the user needs to unlock the smart phone or perform electronic payment, the user usually presses the power button to light the screen of the phone in order to perform a subsequent fingerprint recognition operation. However, this operating mode is cumbersome and user experience is poor.

At least one embodiment of the present disclosure provides a display device including a display panel, a photosensitive image sensor, and a pressure sensing sensor. The display panel includes a display area and has a display side and a back side opposite to the display side. The photosensitive image sensor and the pressure sensing sensor are stacked in the display area of the display panel and located on the back side of the display panel. The pressure sensing sensor is configured to sense a pressing action on the display side of the display panel. The photosensitive image sensor is configured to detect an image of a texture on the display side of the display panel.

At least one embodiment of the present disclosure provides a display device and a method for operating the display device. A photosensitive image sensor and a pressure sensing sensor of the display device are stacked in a display area of a display panel of the display device and located on a back side of the display panel. Thus, for example, the display device is allowed to realize screen lighting and fingerprint recognition upon one press (one press action), and thus the operation is simple and the user experience is improved.

Hereinafter, embodiments of the present disclosure will be described in detail with reference to the accompanying drawings. It should be noted that the same or similar reference numerals in different drawings will be used to refer to the same elements that have been described.

Figure 1B:
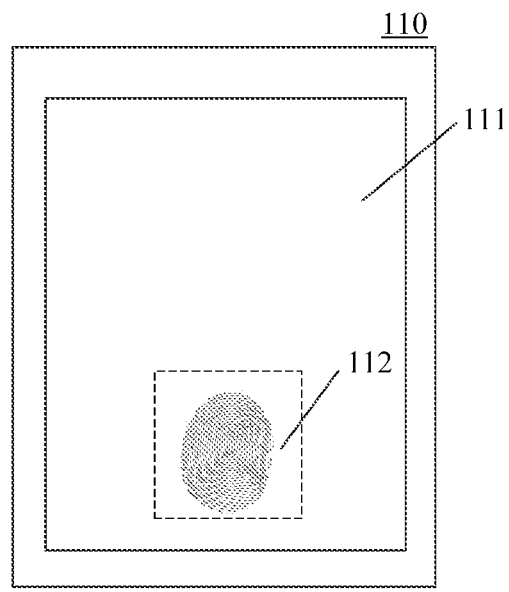
FIG. 1B is a schematic plan view of a display device according to an embodiment of the present disclosure.
Figure 1C:
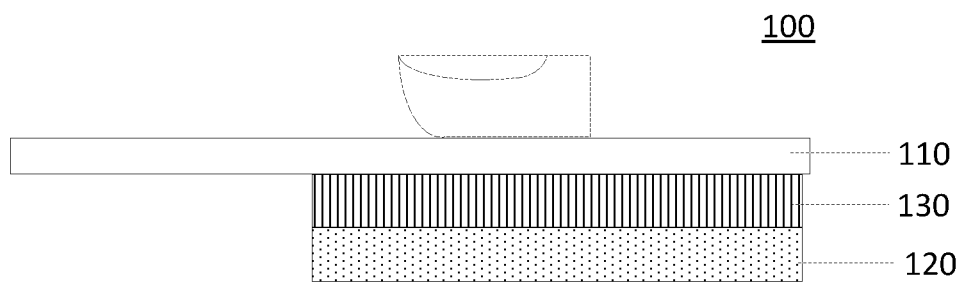
FIG. 1C is a schematic cross-sectional view of another display device according to an embodiment of the present disclosure.

FIG. 1A is a schematic cross-sectional view of a display device 100 according to an embodiment of the present disclosure; FIG. 1B is a schematic plan view of a display panel 110 according to the embodiment; FIG. 1C is a schematic cross-sectional view of another display device 100 according to the embodiment.

Referring to FIGS. 1A and 1C, the display device 100 includes a display panel 110, a pressure sensing sensor 120, and a photosensitive image sensor 130. The photosensitive image sensor 130 and the pressure sensing sensor 120 are stacked in a display area 111 of the display panel 110 and located on a back side of the display panel 110. Thus, the display device integrates a display function, a pressure sensing function, and an under-screen texture recognition function.

In some embodiments of the present disclosure, the display panel 110 may be an organic light emitting diode (OLED) display panel, and may also be a liquid crystal display (LCD) display panel, an electronic paper display panel or the like, which is not limited by the embodiments of the present disclosure. The OLED display panel may be, for example, a flexible OLED display panel. The OLED display panel has self-luminous characteristics, and the illumination of the display pixel unit may be controlled or modulated as needed, thereby facilitating a fingerprint image acquisition and contributing to improve an integration of an electronic device.

As shown in FIGS. 1A and 1B, the display panel 110 includes the display area 111 and has a display side 1101 and a back side 1102 opposite to the display side 1101. The display area 111 includes a fingerprint recognition area 112, which may be part or all of the display area 111, thereby realizing the under-screen fingerprint recognition or a full-screen fingerprint recognition. The user may press the fingerprint recognition area 112 to cause the pressure sensing sensor 120 located on the back side of the display panel 110 to sense the pressing action of a user, thereby causing the photosensitive image sensor 130 to perform a subsequent fingerprint recognition operation.

The pressure sensing sensor 120 can be used to sense the pressing action (i.e., the pressing action in a direction indicated by the arrow in the figure) applied onto the display panel 110. The pressure sensing sensor 120 is coupled to (or in communication with) a processor (described in more detail below). The pressure sensing sensor 120 may be of various types, such as a capacitive pressure sensing sensor, a piezoelectric pressure sensing sensor, or a piezoresistive pressure sensing sensor and the like, which is not limited by the embodiments of the present disclosure.

The photosensitive image sensor 130 may be used to collect a skin texture image of the user such as a fingerprint image, a palm print image or the like, and thus used for fingerprint recognition, palm print recognition and the like. Also, the photosensitive image sensor 130 may be used to collect images of non-biotexture, other than fingerprints and palm prints, of such as a finger film and the like, which is not limited by the embodiments of the present disclosure. The photosensitive image sensor 130 has a certain working area (active area) including a plurality of pixel units arranged in a predetermined array. The photosensitive image sensor is, for example, coupled to (in communication with) the processor (e.g., an integrated circuit chip) by a lead, such that the captured fingerprint image can be transmitted to the processor as data signals. The photosensitive image sensor 130 may be any suitable type of fingerprint sensor such as a charge coupled device (CCD) type or a complementary metal oxide semiconductor (CMOS) type image sensor, which is not limited by the embodiments of the present disclosure. As desired, in some embodiments of the present disclosure, the photosensitive image sensor 130 may be configured to, for example, sense only light of a certain wavelength (e.g., red or green light), and may also sense the full range of visible light. The following specific examples will be described by taking the photosensitive image sensor 130 that is a fingerprint sensor used for the fingerprint recognition as an example.

There are various ways in which the photosensitive image sensor 130 and the pressure sensing sensor 120 are stacked. For example, in an example as shown in FIG. 1A, the pressure sensing sensor 120 may be stacked between the photosensitive image sensor 130 and the back side of the display panel 110. In this configuration, when the pressure sensing sensor 120 senses the pressing action on the display side of the display panel 110, a feedback signal is generated for causing the display panel 110 to emit light. For example, a light emitting device of the display panel 110 itself may emit light, and alternatively the display panel 110 may emit light with the help of an external light source (such as a backlight). The pressure sensing sensor 120 allows at least part of light incident from the display side of the display panel 110 to pass through the pressure sensing sensor 120. Therefore, at least part of the light emitted by the display panel 110 is reflected by the finger and then passes through the pressure sensing sensor 120 to reach the photosensitive image sensor 130. The photosensitive image sensor 130 detects the fingerprint image of the user on the display side of the display panel for performing fingerprint recognition (and possibly further verification). When the fingerprint recognition successes, the system lock state of the electronic device including the display device 100 is unlocked, thereby realizing the lighting of the screen and the system unlocking upon one press.

In this example, for example, the pressure sensing sensor 120 is bonded to the back side of the display panel 110 by a double-sided tape, and the photosensitive image sensor 130 is bonded to the back side of the pressure sensing sensor 120 by another double-sided tape. Thereby the pressure sensing sensor 120 and the photosensitive image sensor 130 are stacked on the back side of the display panel 110. Of course, the pressure sensing sensor 120 and the photosensitive image sensor 130 may be fixed to each other and fixed to the back side of the display panel 110 by other means or ways.

As shown in FIG. 1A, in some embodiments of the present disclosure, the display device may further include a back plate 140, for example, providing encapsulation and protection for a side (i.e., the back side) of the display device opposite to the display side. The stacked structure of the photosensitive image sensor 130 and the pressure sensing sensor 120 directly or indirectly abuts against the back plate 140, so that pressure may act on the pressure sensing sensor 120 and finally be transmitted to the back plate 140 when the display panel 110 is pressed. For example, the back plate 140 may provide a buffer structure at a position corresponding to the stacked structure of the photosensitive image sensor 130 and the pressure sensing sensor 120, thereby providing a protection for the device above.

In the example of this embodiment, by disposing the pressure sensing sensor 120 closer to the display panel 110, the pressure sensing sensor 120 is more sensitive, and thus the pressure detection accuracy is higher.

In another example, as shown in FIG. 1C, the photosensitive image sensor 130 may be stacked between the pressure sensing sensor 120 and the back side of the display panel 110. When the pressure sensing sensor 120 senses the pressing action on the display side of the display panel 110, a feedback signal is generated for causing the display panel 110 to emit light. For example, a light emitting device of the display panel 110 itself may emit light, or the display panel 110 may emit light with the help of an external light source (such as a backlight). Some light emitted by the display panel 110 is reflected by the finger to the photosensitive image sensor 130. The photosensitive image sensor 130 is controlled to detect skin texture image of the user on the display side of the display panel for performing the user skin texture recognition. The system lock state of the electronic device including the display device 100 is unlocked when the texture recognition and the texture verification success thereby realizing the lighting of the screen and the unlocking upon one press.

In an example of this embodiment, for example, the photosensitive image sensor 130 is bonded to the back side of the display panel 110 by a double-sided tape, and the pressure sensing sensor 120 is bonded to the back side of the photosensitive image sensor 130 by another double-sided tape. Thereby the photosensitive image sensor 130 and the pressure sensing sensor 120 are stacked on the back side of the display panel 110. Also, the pressure sensing sensor 120 and the photosensitive image sensor 130 may be fixed to each other and fixed to the back side of the display panel 110 by other means or ways.

The stacked structure of the pressure sensing sensor 120 and the photosensitive image sensor 130 may further directly or indirectly abut against the back plate. For the sake of brevity, the back plate of the display device is not shown in the figures.

In an example of this embodiment, by disposing the photosensitive image sensor 130 closer to the display panel 110, the image recognition accuracy of the photosensitive image sensor 130 is higher, and thus the result of the fingerprint recognition is more reliable.

Of course, the structure of the display device 100 is not limited to the exemplary structures shown in FIGS. 1A-1C. For example, the display device 100 may further include other devices such as a driver chip, a memory, and the like. Details are not described herein.

In the display device provided by at least one embodiment of the present disclosure, the photosensitive image sensor and the pressure sensing sensor are stacked in the display area of the display panel and are located on the back side of the display panel, for example, when the pressure sensing sensor detects that the display panel is pressed by the user, the display panel can be caused to emit light, and the photosensitive image sensor is controlled to perform user skin texture recognition. When the texture recognition successes, the system locking state of the electronic device including the display device is unlocked. Thereby the lighting of the screen and the system unlocking is realized upon one press, and thus the operation is simple and the user experience is improved.

Figure 2:
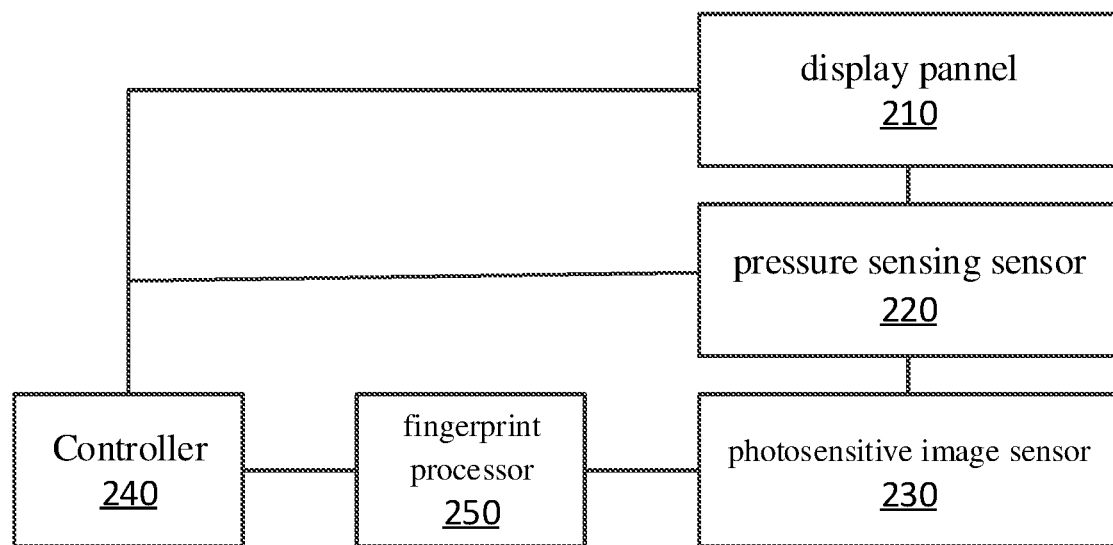
FIG. 2 is a block diagram of still another display device according to an embodiment of the present disclosure.

FIG. 2 is a block diagram of another display device 200 provided by at least one embodiment of the present disclosure. The display device 200 for example is used in a mobile phone or a tablet. As shown in FIG. 2, the display device 200 includes a display panel 210, a pressure sensing sensor 220, a photosensitive image sensor 230, a controller 240, and a fingerprint processor 250. The display panel 210, the pressure sensing sensor 220, and the photosensitive image sensor 230 may be the same as the implementations of the display panel 110, the pressure sensing sensor 120, and the photosensitive image sensor 130 in the previous embodiments, and are not described herein again. The controller 240 is coupled to (or in communication with) the display panel 210, the pressure sensing sensor 220, the photosensitive image sensor 230, and the fingerprint processor 250, respectively.

When the pressure sensing sensor 220 senses a pressing action of a user upon the display side of the display panel 210, the pressure sensing sensor 220 sends a feedback signal to the controller 240. The feedback signal may include information that display panel 210 is pressed by the user. In some embodiments, the feedback signal may further include information about a pressing force amplitude (or force level), a pressing position, and the like.

The controller 240 receives the feedback signal sent by the pressure sensing sensor 220. The controller 240 controls the display panel 210 to emit light, that is, to light the screen; the controller 240 also controls the photosensitive image sensor 230 at the same time to start to collect a fingerprint image, and sends the fingerprint image to the fingerprint processor 250 to perform user fingerprint recognition (and further verification). Thereafter, the fingerprint processor 250 then sends a fingerprint recognition result to the controller 240, and the controller 240 performs a subsequent (predetermined) operation based on the fingerprint recognition result. When the controller 240 controls the display panel 210 to emit light to turn on the screen, for example, the system of such as a mobile phone or a tablet is in a standby state, waiting for the user to input a password or the like to unlock the system. Accordingly, when the fingerprint recognition successes, the controller 240 controls the system of such as a mobile phone or a tablet to enter a working state in which for example the operation interface of the application before the turn-off-screen state (that is, the state in which the screen is turned off) is displayed. The embodiments of the present disclosure are not limited in this aspect.

As a modified embodiment, the photosensitive image sensor 230 may transmit the fingerprint image imaged by the photosensitive image sensor 230 to the controller 240. The controller 240 may transmit the fingerprint image of the user to the fingerprint processor 250 in turn to cause the fingerprint processor 250 to complete the user texture image recognition. For example, if the user's texture recognition successes, the controller 240 unlocks the system lock state of the electronic device including the display device. If the user's texture recognition fails or the verification fails, the controller 240 controls the display panel 210 not to emit light, that is, causes the display device 100 to remain in the state in which the screen is turned off.

In one or more embodiments of the present disclosure, the fingerprint processor may be implemented by a general purpose processor or a dedicated processor. The controller may be various types of integrated circuit chips with processing functions, which may have various computing architectures, such as a Complex Instructions Set Computer (CISC) structure, a Reduced Instruction Set Computer (RISC) structure, or a structure that implements a combination of multiple instruction sets. In some embodiments, the controller may be a microprocessor, such as an X86 processor or an ARM processor, or a digital processor (DSP) or the like.

Figure 3A:
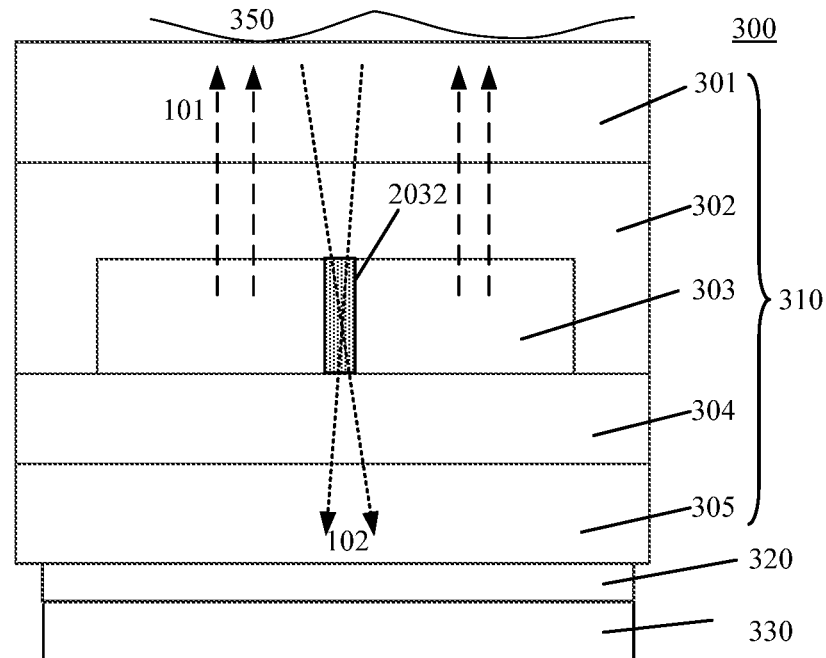
FIGS. 3A-FIG. 3B are schematic cross-sectional views of yet another display device according to an embodiment of the present disclosure.
Figure 3B:
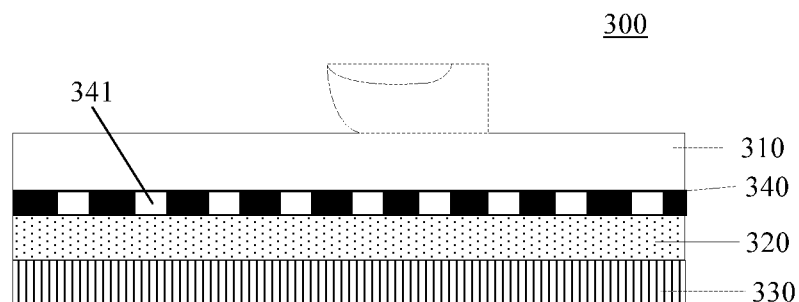

FIGS. 3A and 3B are schematic cross-sectional views of a display device 300 according to at least one embodiment of the present disclosure. Referring to the embodiment of FIG. 3A, the display device 300 includes a display panel 310, a pressure sensing sensor 320, and a photosensitive image sensor 330. In the embodiment, the display panel 310 is an OLED display panel.

As shown in FIG. 3A, the OLED display panel 310 includes a top film 301, a thin film package 302, a pixel unit array 303, a flexible substrate 304, and an underlying film 305.

The underlying film 305 provides protection and support for other structural and functional layers located thereon. The underlying film 305 is for example a plastic substrate or a glass substrate having relatively larger strength. The flexible substrate 304 is used to provide a buffer, and is for example a flexible substrate made of material such as polyimide (PI), polypropylene (PP), polycarbonate (PC), or the like.

The pixel unit array 303 is formed on the flexible substrate 304, and includes a plurality of pixel units arranged in a predetermined array and signal lines (including gate lines, data lines, detecting lines etc.) for providing electrical signals (including scanning signals, data signals, detecting signals etc.). Each of the pixel units includes a light emitting device (for example, an OLED device) and a pixel driving circuit for driving the light emitting device (OLED device) to emit light and the like. The light 101 emitted by the pixel unit is used for display and also as incident light for under-screen fingerprint detection. Specifically, the light 101 emitted by the light emitting device in the pixel unit during operation is reflected by a user's skin (finger or palm) 350 on the display side of the display panel for the user skin texture image recognition.

The thin film package 302 covers the pixel unit array 303 to prevent external moisture from entering into the pixel unit array 303 to cause aging or deterioration thereof. The thin film package 302 may be a single-layer thin film package or a multilayer thin film package, for example, including a inorganic insulating layer and an organic insulating layer that are laminated together, etc.

The top film 301 may be a cover plate, such as a substrate or a thick film made of glass or plastic, for providing support and protection, for example, for the user to perform touch, press, and the like.

The OLED display panel 310 may also include other structural or functional layers as desired. For example, the OLED display panel 310 can include a touch structure for implementing a touch function. The touch structure may be built in the pixel unit array 303, or formed on the top film, and the like. The touch structure may be for example, a capacitive type, a resistive type, or the like.

In order to realize the under-screen fingerprint detection, the top film 301, the thin film package 302, the flexible substrate 304, and the underlying film 305 are at least partially transparent, and apertures 2032 are formed between the adjacent pixel units in the pixel unit array 303 so that the light reflected by the fingerprint on the surface of the top film 301 can be incident on the photosensitive image sensor 330 and a fingerprint image can be acquired through a pinhole imaging effect. For example, the OLED display panel 310 can include a microlens array (not shown). The microlens array is formed, for example, corresponding to the aperture 2032 described above. The microlens array modulates (e.g., collimates) depending on its location the light 102 that will pass through the aperture 2032 or modulates (e.g., collimates) the light 102 that has passed through the aperture 2032. The modulated light 102 is incident on the photosensitive image sensor 330.

Referring to the embodiment of FIG. 3B, the display device 300 includes a display panel 310, a pressure sensing sensor 320, a photosensitive image sensor 330, and a light shielding layer 340. Different from the embodiment of FIG. 3A, the structure for realizing the pinhole imaging in this embodiment is not formed in a display array structure of the display panel, but is formed in the light shielding layer 340 that is separately provided. The light shielding layer 340 is for example formed on the back side of the display panel 310. The light shielding layer 340 includes a plurality of apertures 341 arranged in an array. The apertures overlap with the photosensitive image sensor 330 in a direction perpendicular to the display panel 310. The apertures 341 are configured to allow light from the display side of the display panel 310 to pass through the respective apertures to reach the photosensitive image sensor 330 for pinhole imaging.

In the display device provided by the at least one embodiment shown in FIG. 3A and FIG. 3B, the photosensitive image sensor and the pressure sensing sensor are stacked in the display area of the display panel in the display device and located on the back side of the display panel. When the pressure sensing sensor detects that the display panel is pressed by the user, the controller controls the display panel to emit light and controls the photosensitive image sensor to perform user skin texture recognition. For example, when the texture recognition successes, the controller controls to unlock the system lock state of the electronic device including the display device. Thereby the lighting of the screen and the unlocking the system are realized upon one press, and thus the operation is simple and the user experience is improved.

There are many implementations of the pressure sensing sensor 320. The exemplary structure of the pressure sensing sensor 320 will be described below. Of course, it is to be understood that the structure of the pressure sensing sensor 320 in the embodiment of the present disclosure is not limitative.

Figure 4:
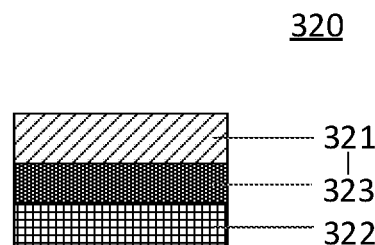
FIG. 4 is a schematic view of a laminar structure of a pressure sensing sensor according to an embodiment of the present disclosure.

FIG. 4 is a schematic diagram of the laminar structure of the pressure sensing sensor 320 according to an embodiment of the present disclosure. Referring to FIG. 4, the pressure sensing sensor 320 includes a first electrode 321, a second electrode 322, and a pressure sensing layer 323. The first electrode 321 and the second electrode 322 are disposed in a stack. The pressure sensing layer 323 is disposed between the first electrode 321 and the second electrode 322. The first electrode 321 being is closer to the display panel than the second electrode 322.

The transmissivity of the first electrode 321 and/or the second electrode 322 is greater than a first predetermined threshold, and the first predetermined threshold may be set as needed. By configuring the first electrode 321 and/or the second electrode 322 as transparent as possible, light reflected by the user's finger can better pass through the pressure sensing sensor 320 and reach the photosensitive image sensor 330 to perform the acquisition of the user's fingerprint image and better fingerprint recognition, which improves the accuracy of user skin texture image recognition. For example, the first electrode 321 and the second electrode 322 are made of a transparent conductive material, such as tin oxide, indium tin oxide, carbon nanotubes, or the like.

For example, the pressure sensing layer 323 may be a sensing layer that senses a pressure change by sensing the change in capacitance between the first electrode 321 and the second electrode 322. For example, the pressure sensing layer 323 may include an optical transparent adhesive layer or a void layer (e.g. air layer). The optical transparent adhesive layer can achieve the buffering effect for the pressing operation and can achieve a more controllable pressure sensing. A specific kind of transparent adhesive layer and related preparation processes can, for example, be selected according to the light emitting characteristics of the light emitting device. Also, the refractive index of the optical transparent adhesive layer can be conveniently controlled to facilitate the realization of a total reflection structure. When the pressure sensing sensor is formed by adopting the void layer, the manufacturing process is simpler.

The pressure sensing layer 323 may also be a sensing layer that senses a pressure change by sensing a change in electrical current/resistance between the first electrode 321 and the second electrode 322. For example, the pressure sensing layer 323 may be a piezoelectric pressure sensing layer or a piezoresistive pressure sensing layer. For example, the piezoelectric pressure sensing layer may include a piezoelectric polymer such as polyvinylidene fluoride (PVDF) and the piezoresistive pressure sensing layer may include a semiconductor material such as silicon or germanium. Of course, the implementation of the present disclosure does not limit the type and specific structure of the pressure sensing sensor 320 as long as it meets the respective requirements of the above embodiments (for example, light transmission or the like).

The pressure sensing sensor 320 may be of a single body type, or may include a plurality of sub-sensing pixels, which are arranged, for example, in a plurality of rows and columns, and connected to corresponding signal lines (e.g., row lines, column lines). Thereby the pressure sensing sensor 320 can detect the pressing operation more accurately, such as detecting a specific position of a pressing operation, and the like.

Figure 5A:
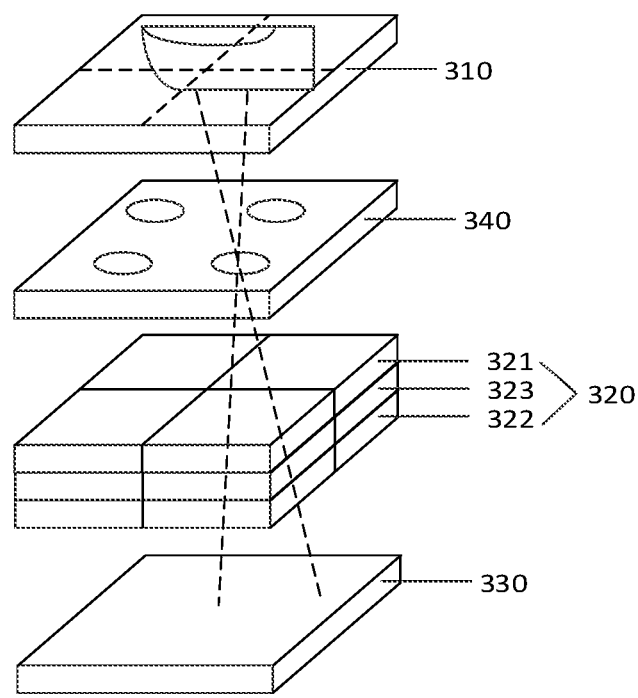
FIGS. 5A-5B are schematic diagrams explaining settings of refractive indexes in order to reduce stray light according to an embodiment of the present disclosure.
Figure 5B:
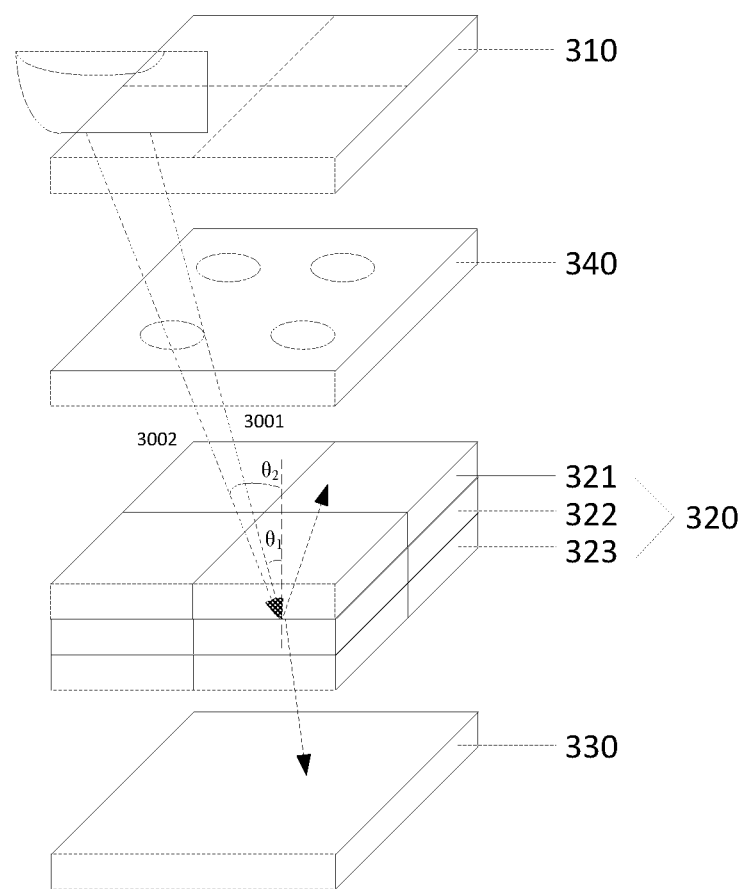

In the above embodiment in which the skin texture recognition is performed using a pinhole imaging effect, in order to realize the pinhole imaging, a certain imaging angle is ensured, thus requiring to filter stray light in a large viewing angle direction. As shown in FIG. 5A and FIG. 5B, light emitted by the display panel 310 and reflected by the skin texture of the user or light externally incident may form stray light in a large viewing angle direction. The stray light may affect the user skin texture recognition by the photosensitive image sensor 330. Therefore, the refractive indexes of the media on either side of a certain interface on the light incident path can be selected to achieve filtering of stray light. For example, the first electrode and the pressure sensing layer in the pressure sensing sensor 320 are of different materials. The stray light can be filtered by controlling the refractive indexes of the first electrode and the pressure sensing layer. For the embodiments such as that shown in FIG. 1A or similar embodiments, the refractive index of the first electrode of the pressure sensing sensor 320, the refractive index of the pressure sensing layer, and the maximum imaging angle of the pinhole imaging may be configured to comply with:

$$\frac{n_1}{n_2} = \frac{1}{\sin\theta_1}$$

where n1 is the refractive index of the first electrode, n2 is the refractive index of the pressure sensing layer, and θ1 is the total reflection angle at the interface between the first electrode and the pressure sensing layer. Here, the total reflection angle is selected as the maximum imaging angle of light incident from the display side of the display panel through the aperture to be imaged on the photosensitive image sensor, and the refractive index n1 of the first electrode is greater than the refractive index n2 of the pressure sensing layer.

As shown in FIG. 5B, the maximum imaging angle θ1 is a maximum incident angle of light 3301 incident from the display side of the display panel that is able to pass through the aperture and be transmitted through the pressure sensing sensor 320 to form an image on the photosensitive image sensor 330. In this example, the maximum incident angle can be determined based on the total reflection angle θ1 at the interface between the first electrode and the pressure sensing layer of the pressure sensing sensor 320. Therefore, only when the incident angle of the light 3301 incident from the display side of the display panel is less than θ1, the incident light 3301 can pass through the interface between the first electrode and the pressure sensing layer of the pressure sensing sensor 320, and can further form an image on the photosensitive image sensor 330. When the incident angle of the light 3302 incident from the display side of the display panel is larger than θ1, the incident light 3302 is totally reflected at the interface between the first electrode and the pressure sensing layer of the pressure sensing sensor 320 and is not able to reach the photosensitive image sensor 330 for imaging because the incident angle θ2 is larger than the maximum imaging angle θ1.

By setting the refractive index n1 of the first electrode to be larger than the refractive index of the pressure sensing layer n2, it is possible to eliminate stray light in a large viewing angle direction by using the principle of total reflection, so that stray light in the large viewing angle direction is filtered out rather than imaged on the photosensitive image sensor 330. Thus, the user texture recognition of the photosensitive image sensor 330 has a higher accuracy and the user experience is better.

Further embodiments of the present disclosure also provide an electronic device including a light emitting panel, a photosensitive image sensor, and a pressure sensing sensor. The light emitting panel includes a light emitting region and has a first side and a second side opposite to the first side. The photosensitive image sensor and the pressure sensing sensor are stacked in the light emitting area of the light emitting panel and located on the second side of the light emitting panel. The pressure sensing sensor is configured to sense a pressing action on the first side of the light emitting panel. The photosensitive image sensor is configured to detect an image of a texture on the first side of the light emitting panel.

For example, the electronic device is a display device or other electronic device having a fingerprint recognition function such as an access control device, etc. For example, the light emitting panel may be an LED light emitting panel, an OLED light emitting panel, or a backlight module (including, for example, a light guide plate). Alternatively, light emitting panel may be a display panel. The electronic device may be used for a biotexture (e.g., fingerprint or palm print) recognition, or a non-biotexture (e.g., finger film) recognition.

In some embodiments of the electronic device, for example, the pressure sensing sensor is stacked between the photosensitive image sensor and the second side of the light emitting panel; the pressure sensing sensor is further configured to allow light incident from the first side of the light emitting panel to pass through the pressure sensing sensor to reach the photosensitive image sensor.

In some embodiments of the electronic device, for example, the photosensitive image sensor is stacked between the pressure sensing sensor and the second side of the light emitting panel.

In some embodiments of the electronic device, the electronic device further includes a light shielding layer, and the light shielding layer includes a plurality of aperture arranged in an array. The apertures overlap with the photosensitive image sensor in a direction perpendicular to the light emitting panel. The apertures are configured to allow light from the first side of the light emitting panel to pass through the respective aperture to reach the photographic image sensor for pinhole imaging.

In some embodiments of the electronic device, for example, the pressure sensing sensor includes a first electrode, a second electrode, and a pressure sensing layer and the first electrode, the second electrode, and the pressure sensing layer are disposed in a stack. The pressure sensing layer is disposed between the first electrode and the second electrode, the first electrode is closer to the light emitting panel than the second electrode.

Further embodiments of the present disclosure provide a method for operating the display device described above, and the method includes: causing the pressure sensing sensor to detect whether the display panel is pressed by a user, causing the display panel to emit light, and controlling the photosensitive image sensor to perform a user skin texture recognition.

Similarly, still further embodiments of the present disclosure provide a method for operating the electronic device described above, and the method includes: causing the pressure sensing sensor to detect whether the light emitting panel is pressed by a user, causing the light emitting panel to emit light and controlling the photosensitive image sensor to perform a texture recognition.

Figure 6:
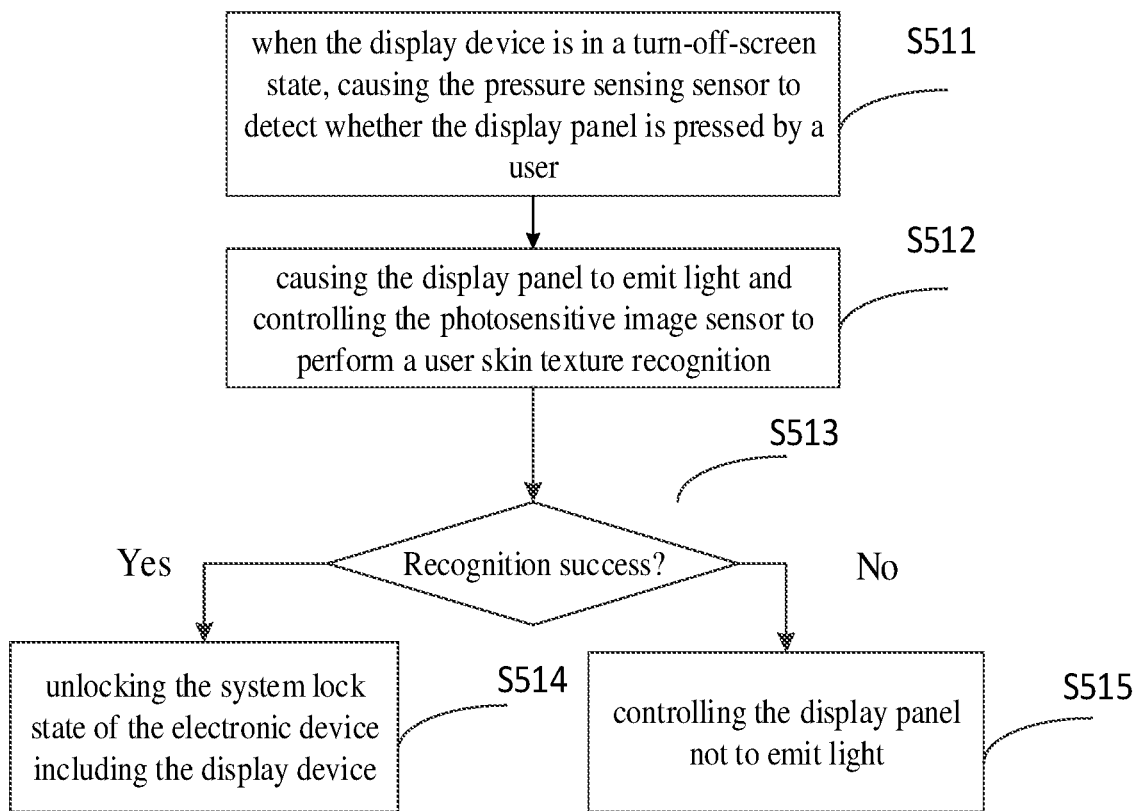
FIG. 6 is a schematic diagram of an operating method and a principle of a display device according to an embodiment of the present disclosure.

The operation method and the principle of the display device according to at least one embodiment of the present disclosure will be exemplarily described below with reference to FIG. 6.

Step S511, when the display device is in a turn-off-screen state, the pressure sensing sensor 320 is caused to detect whether the display panel 310 is pressed by the user.

Step S512, if the pressure sensing sensor 320 detects that the display panel 310 is pressed by the user, the display panel 310 is caused to emit light and control the photosensitive image sensor 330 to perform the user skin texture recognition.

For example, in the embodiment shown in FIG. 5A, if the pressure sensing sensor 320 senses a user's pressing action on the display side of the display panel 310, the display panel 310 is caused to emit light. The light emitted by the display panel 310 is propagated upward and then reflected by a skin texture (e.g., a fingerprint or a palm print) of the user. The reflected light passes through the aperture in the light shielding layer 340, is transmitted through the pressure sensing sensor 320, and forms an image of the user skin texture on the photosensitive image sensor 330. The photosensitive image sensor 330 is further controlled to transmit the data of the image of the user skin texture to perform the user skin texture recognition for example.

Step S513, it is determined whether the user skin texture recognition successes. If the recognition successes, step S514 is performed; otherwise, step S515 is performed.

Step S514, the system lock state of the electronic device including the display device is unlocked.

After the system locking state of the electronic device is unlocked, the user can further perform subsequent operations such as payment operations. The user experience is further improved.

Step S515, the display panel is controlled not to emit light.

When the user skin texture recognition, that is, the identity authentication fails, the system lock state of the electronic device may not be unlocked and the display device may remain in the turn-off-screen state to save power. Alternatively, the display device may also be in a turn-on-screen state (that is, the state in which the screen is turned on) for at least a period of time, as needed, thereby allowing the user to perform other possible operations, such as entering a character password or the like.

In another example, the pressure sensing sensor 320 has a pressing position detecting function. That is, the pressure sensing sensor 320 can detect a position in the display area of the display panel pressed by the user. When the controller determines the position pressed by the user is in a fingerprint recognition area of the display panel, the controller can cause the display panel 310 to emit light and control photosensitive image sensor 330 to perform the user skin texture recognition. For example, only the pixel unit(s) in the fingerprint recognition area may be caused to emit light to display a specific pattern (e.g., a fingerprint pattern to guide the user to perform a fingerprint recognition operation) and the photosensitive image sensor 330 may be controlled to perform the user skin texture recognition. When the controller determines that the position pressed by the user is not in the fingerprint recognition area of the display panel, the display panel 310 may remain in the turn-off-screen state.

In the display device and the method for operating the display device provided by at least some embodiments of the present disclosure, the photosensitive image sensor and the pressure sensing sensor are stacked in the display area of the display panel in the display device and located on the back side of the display panel. When the pressure sensing sensor detects the display panel is pressed by the user, the display panel is controlled to emit light and the photosensitive image sensor is controlled to perform the user skin texture recognition. When the texture recognition successes, the controller controls to unlock the system locking state of the electronic device including the display device, thereby realizing the lighting of the screen and the system unlocking upon one press. The operation is simple and the user experience is improved. Moreover, the total reflection principle is used to eliminate stray light in the large viewing angle direction, so that the user texture recognition has a higher accuracy and the user experience is better.

At least one embodiment of the present disclosure also provides a method for operating a display device, the display device including a display panel, a photosensitive image sensor, and a pressure sensing sensor. The display panel includes a display area and has a display side and a back side opposite the display side. The photosensitive image sensor is disposed corresponding to the display area and is configured to detect a skin texture of a user on the display side of the display panel. The pressure sensing sensor is disposed corresponding to the display area and is configured to sense a pressing action on the display side of the display panel. The method includes:

Step S611, causing the pressure sensing sensor to sense the pressing action on the display side of the display panel; and Step S611, causing the display panel to emit light, and control the photosensitive image sensor to perform a texture image recognition.

The system lock state of the electronic device including the display device is unlocked in a case where the texture image recognition successes.

Implementation of Steps S611-S612 are the same as or similar to Steps S511-S512 in the previous embodiments, and are not described herein again. Also, the method may also include the same or similar steps as Steps S513-S514 in the previous embodiments, and are not described herein again.

In some of the above embodiments, at least one of the photosensitive image sensor and the pressure sensing sensor of the display device are integrated into the display panel. Alternatively, the photosensitive image sensor and the pressure sensing sensor may be disposed on the back side of the display panel and disposed on the same layer. That is, in the display device in which the photosensitive image sensor and the pressure sensing sensor are not stacked, the above method can also realize the lighting of the screen and the unlocking upon one press. When at least one of the photosensitive image sensor and the pressure sensing sensor is integrated into the display panel, it can be fabricated on an array substrate of the display panel by, for example, a semiconductor fabrication process, which is compatible with a fabrication process of the array substrate.

The method for operating a display device provided by at least one embodiment of the present disclosure can be used in a display device of various structures and can realize the lighting of the screen and the unlocking upon one press. The operation is simple.

There are a few points to note:

(1) The drawings of the embodiments of the present disclosure relate only to the structures involved in the embodiments of the present disclosure, and other structures can be referred to the general design.

(2) In the case of no conflict, the embodiments of the present disclosure and the features in the embodiments can be combined with each other to obtain a new embodiment.

The foregoing are merely exemplary embodiments of the disclosure, but are not used to limit the protection scope of the disclosure. The protection scope of the disclosure shall be defined by the attached claims.

What is claims is:

1. A display device comprising: a display panel, a photosensitive image sensor for pinhole imaging, and a pressure sensing sensor, wherein the display panel comprises a display area and has a display side and a back side opposite to the display side, the photosensitive image sensor and the pressure sensing sensor are stacked in the display area of the display panel and are located on the back side of the display panel, the pressure sensing sensor is configured to sense a pressing action on the display side of the display panel, the photosensitive image sensor is configured to detect an image of a texture on the display side of the display panel, wherein the pressure sensing sensor is stacked between the photosensitive image sensor and the back side of the display panel, and wherein the pressure sensing sensor comprises a first electrode, a second electrode, and a pressure sensing layer, the first electrode, the second electrode, and the pressure sensing layer are disposed in a stack, the pressure sensing layer is disposed between the first electrode and the second electrode, the first electrode is closer to the display panel than the second electrode, wherein a refractive index of the first electrode, a refractive index of the pressure sensing layer, and a maximum imaging angle of the pinhole imaging comply with:

$$\frac{n_1}{n_2} = \frac{1}{\sin\theta_1}$$

in which n1 is the refractive index of the first electrode, n2 is the refractive index of the pressure sensing layer, and θ1 is the maximum imaging angle of light incident from the display side of the display panel through apertures to be imaged on the photosensitive image sensor.

2. The display device according to claim 1, further comprising a light shielding layer, wherein the light shielding layer comprises a plurality of apertures arranged in an array, the apertures overlap with the photosensitive image sensor in a direction perpendicular to the display panel, and the apertures are configured to allow light from the display side of the display panel to pass through the apertures to reach the photosensitive image sensor for pinhole imaging.

3. The display device according to claim 1, wherein the pressure sensing layer comprises one selected from a group consisting of an optical transparent adhesive layer and a void layer.

4. The display device according to claim 1, wherein the display panel comprises a pixel array, the pixel array comprises a plurality of pixel units, an aperture is formed between adjacent pixel units, the aperture overlaps with the photosensitive image sensor in a direction perpendicular to the display panel, and the aperture is configured to allow light from the display side of the display panel to pass through the aperture to reach the photosensitive image sensor for pinhole imaging.

5. The display device according to claim 4, wherein the pixel unit comprises a light emitting device, light emitted by the light emitting device during operation is reflected by the texture on the display side of the display panel for a texture image recognition.

6. The display device according to claim 1, further comprising a controller, wherein the controller is configured to receive a feedback signal sent by the pressure sensing sensor after the pressure sensing sensor has sensed the pressing action on the display side of the display panel, control the display panel to emit light, and control the photosensitive image sensor to perform a texture image recognition.

7. An method for operating a display device according to claim 1, comprising:
casing the pressure sensing sensor to detect whether the display panel is pressed,
causing the display panel to emit light, and
controlling the photosensitive image sensor to perform a texture image recognition.

8. The method according to claim 7, further comprising:
unlocking a system lock state of an electronic device comprising the display device in a case where the texture image recognition successes; or
controlling the display panel not to emit light in a case where the texture image recognition fails.

9. A method for operating a display device, the display device comprising a display panel, a photosensitive image sensor for pinhole imaging, and a pressure sensing sensor, the display panel comprising a display area and having a display side and a back side opposite to the display side, the photosensitive image sensor being disposed corresponding to the display area and being configured to detect a texture on the display side of the display panel, the pressure sensing sensor being disposed corresponding to the display area and being configured to sense a pressing action of the display side of the display panel, wherein the pressure sensing sensor is stacked between the photosensitive image sensor and the back side of the display panel, and wherein the pressure sensing sensor comprises a first electrode, a second electrode, and a pressure sensing layer,
the first electrode, the second electrode, and the pressure sensing layer are disposed in a stack,
the pressure sensing layer is disposed between the first electrode and the second electrode,
the first electrode is closer to the display panel than the second electrode,
wherein a refractive index of the first electrode, a refractive index of the pressure sensing layer, and a maximum imaging angle of the pinhole imaging comply with:

$$\frac{n_1}{n_2} = \frac{1}{\sin\theta_1}$$

in which n1 is the refractive index of the first electrode, n2 is the refractive index of the pressure sensing layer, and θ1 is the maximum imaging angle of light incident from the display side of the display panel through apertures to be imaged on the photosensitive image sensor.

10. An electronic device comprising: a light emitting panel, a photosensitive image sensor, and a pressure sensing sensor, wherein the light emitting panel comprises a light emitting area, and has a first side and a second side opposite to the first side, the photosensitive image sensor and the pressure sensing sensor are stacked in the light emitting area of the light emitting panel and located on the second side of the light emitting panel, the pressure sensing sensor is configured to sense a pressing action on the first side of the light emitting panel, and the photosensitive image sensor is configured to detect an image of a texture on the first side of the light emitting panel wherein the pressure sensing sensor is stacked between the photosensitive image sensor and the back side of the display panel, and wherein the pressure sensing sensor comprises a first electrode, a second electrode, and a pressure sensing layer, the first electrode, the second electrode, and the pressure sensing layer are disposed in a stack, the pressure sensing layer is disposed between the first electrode and the second electrode,
the first electrode is closer to the display panel than the second electrode,
wherein a refractive index of the first electrode, a refractive index of the pressure sensing layer, and a maximum imaging angle of the pinhole imaging comply with:

$$\frac{n_1}{n_2} = \frac{1}{\sin\theta_1}$$

in which n1 is the refractive index of the first electrode, n2 is the refractive index of the pressure sensing layer, and θ1 is the maximum imaging angle of light incident from the display side of the display panel through apertures to be imaged on the photosensitive image sensor.

11. The electronic device according to claim 10, further comprising a light shielding layer,
wherein the light shielding layer comprises a plurality of apertures arranged in an array, the apertures overlap with photosensitive image sensor in a direction perpendicular to the light emitting panel, and
the apertures are configured to allow light from the first side of the light emitting panel to pass through the apertures to reach the photosensitive image sensor for pinhole imaging.

* * * * *